(12) United States Patent
McInnes

(10) Patent No.: US 8,178,464 B2
(45) Date of Patent: May 15, 2012

(54) ISOCYANATE PREPOLYMER CATALYSTS AND RELATED CURING PROCESSES

(76) Inventor: Alan D. McInnes, Sydney (AU); Iona Mary McInnes, legal representative, St Ives (AU)

( * ) Notice: Subject to any disclaimer, the term of this patent is extended or adjusted under 35 U.S.C. 154(b) by 1136 days.

(21) Appl. No.: 11/526,462

(22) Filed: Sep. 25, 2006

(65) Prior Publication Data

US 2007/0197375 A1    Aug. 23, 2007

Related U.S. Application Data

(60) Provisional application No. 60/719,899, filed on Sep. 23, 2005.

(51) Int. Cl.
  *B01J 31/00* (2006.01)
  *B05D 3/02* (2006.01)
(52) U.S. Cl. .................. 502/162; 502/167; 427/384
(58) Field of Classification Search ............ 502/162
  See application file for complete search history.

(56) References Cited

U.S. PATENT DOCUMENTS

| | | | | |
|---|---|---|---|---|
| 4,365,670 A | * | 12/1982 | McLaughlin | 166/295 |
| 4,631,206 A | * | 12/1986 | Mabuchi et al. | 427/340 |
| 4,788,083 A | * | 11/1988 | Dammann et al. | 427/340 |
| 5,418,259 A | * | 5/1995 | Broos et al. | 521/159 |
| 6,348,121 B1 | * | 2/2002 | Schoener et al. | 156/307.1 |
| 6,989,429 B2 | * | 1/2006 | Feng | 528/28 |

FOREIGN PATENT DOCUMENTS

| | | |
|---|---|---|
| GB | 2 166 976 A | 5/1986 |
| WO | WO8402665 | 7/1984 |
| WO | WO 86/01749 | 3/1986 |
| WO | WO8601749 | 3/1986 |
| WO | WO8703576 | 6/1987 |
| WO | WO 2004/022249 | 3/2004 |
| WO | WO 2007034330 A2 | 3/2007 |

OTHER PUBLICATIONS

PCT/IB2006/003278; International Search Report; mailed Aug. 8, 2007.

* cited by examiner

*Primary Examiner* — Melvin C Mayes
*Assistant Examiner* — Yun Qian
(74) *Attorney, Agent, or Firm* — Lathrop & Gage LLP

(57) ABSTRACT

Isocyanate prepolymer catalysts and processes for rapidly curing isocyanate prepolymers are disclosed herein. Substrates coated with the isocyanate prepolymers are treated with a drying agent and water, which combine to form a hydrated catalyst complex. Co-catalysts, such as organo tins, may be used to further enhance the curing rate.

1 Claim, No Drawings

ISOCYANATE PREPOLYMER CATALYSTS AND RELATED CURING PROCESSES

RELATED APPLICATIONS

This application claims priority to U.S. patent application Ser. No. 60/719,899, filed Sep. 23, 2005, which is incorporated by reference herein.

BACKGROUND

One of the most critical factors in painting is drying time. To accelerate the drying process, heat from a thermal oven is frequently used. However, commercial ovens are expensive to buy and operate, and the physical properties of the painted materials can make oven drying non-viable. For example, plastic is used to form many industrial products, but heat distorts and weakens plastic. Higher temperatures also pose a problem with timber and fiber cement, which contain a high percentage of moisture. Heating these materials causes water to leave the substrate, leading to warping, splitting and other forms of stability loss. Other materials, such as glass and metal, which are unaffected by heat, have high specific heat capacities and therefore require a great deal of energy in order to maintain the surface at an appropriate temperature for drying. Additionally, in order to avoid breakage of glass, uniform heating and cooling are critical. In light of such problems, manufacturers frequently dry products by setting them aside between coats. Not only do lengthy curing times slow deliveries and require valuable space, they also increase the chance that inclusions will contaminate the wet film.

SUMMARY

The disclosed instrumentalities overcome the problems described above and advance the art by providing isocyanate prepolymer catalysts and processes for rapidly curing isocyanate prepolymers.

In one embodiment, a process for forming a dried coating upon a substrate includes applying a wet coating to a surface of the substrate, the wet coating including an isocyanate prepolymer, and polymerizing the wet coating by providing an atmosphere including a drying agent/co-catalyst complex and relative humidity in a range of about 40-80%.

In another embodiment, a process for forming a dried coating upon a substrate includes applying a wet coating to a surface of the substrate, the wet coating including an isocyanate prepolymer, and polymerizing the wet coating by providing an atmosphere including a drying agent/co-catalyst complex and relative humidity in a range of about 40-80%, wherein the drying agent and water vapor form a hydrated catalyst complex having about a 5:1 water to drying agent ratio.

In one embodiment, a catalyst for the polymerization of isocyanates includes a drying agent selected from the group consisting of ammonia, amines, alkanolamines, and combinations thereof and a co-catalyst selected from the group consisting of organometallics, inorganic metal salts, and combinations thereof, wherein the drying agent and the co-catalyst form a complex.

DETAILED DESCRIPTION

Isocyanate prepolymers may, for example, be used in paints, lacquers, varnishes, printing inks, liquid adhesives, surface coatings, caulking compounds and the like. The coating and curing processes described herein are performed without the application of excess heat and may be used on a wide variety of substrates. For example, substrates may include plastic, wood, glass, metal, and fiber cement. Substrates coated and cured by processes described herein may be regularly or irregularly shaped, e.g., bottle-shaped.

The word "coating", when used as a noun herein, is to be understood as synonymous with "film" (or the like). The word "drying" includes within its ambit "curing" and "polymerizing". A coating is considered dry when it is either free from "tack", insoluble in solvent, possessed of an advanced degree of integrity, or able to withstand reasonable abrasion or pressure without damage. A coating that is not "dry" is "wet", thus wet coatings are those that are uncured, tacky or subject to desolving or deforming.

Isocyanate (—N=C=O) prepolymers, such as monomers, oligomers, and/or polymers of urea, urethane, isocyanurate, biuret, and allophanates, are polymerized when reacted with water vapor. These prepolymers are suitable for use with the present systems and methods.

Isocyanate prepolymers may be used in one-component paint systems (i.e., those containing only isocyanates, as opposed to two-component paint systems that contain both isocyanates and compounds bearing hydroxyl functional groups) and rapidly cured in the presence of both water and a drying agent. For example, drying typically takes place in about 2-10 minutes, or about 3-8 minutes, or about 4-6 minutes.

A short-lived chemical intermediate, referred to herein as a hydrated catalyst complex, is formed by the combination of about one drying agent molecule for every five water molecules. The hydrated catalyst complex may be present in an amount from about 1 to 5000 ppm, or from about 10 to 2500 ppm, or from about 100 to 1000 ppm. The presence of the hydrated catalyst complex may be observed by monitoring the heat of combustion of the hydrated catalyst complex, as described in WO 86/01749, which is hereby incorporated by reference.

A "drying agent" is a chemical composition that when combined with water forms a "hydrated catalyst complex" that accelerates or catalyzes the drying of a wet coating. The drying agent may be selected from an amine, or any other hydratable compound. Suitable amines include tertiary amines and alkanolamines, which can either be polyfunctional, aromatic, aliphatic or cycloaliphatic in nature. Specific examples are triethylamine (TEA) and dimethylethanolamine (DMEA), and ditertiary amines such as N,N,N',N'-tetramethylethylenediamine (TMEDA) and N,N,N',N',2-pentamethyl-1,2-propanediamine (PMT), and combinations thereof. The drying agent(s) is/are usually present at a "parts per million" level. For example, DMEA may be used in a concentration ranging from about 500 to 5000 parts per million, TMEDA may be used in a concentration ranging from about 250 to 2500 parts per million, and PMT may be used in a concentration ranging from about 200 to 2000 parts per million.

Additionally, it has been shown that drying agents, such as the amines described above, can be coupled or complexed in the catalyzing atmosphere with organometallic compounds such as dibutyl tin dilaurate, lead tetraethyl, titanium acetyl acetonate, dimethyl tin dichloride, stannous and zinc octoates, and combinations thereof. These organometallic compounds are referred to herein as "co-catalysts". The drying agent/co-catalyst complex may be used to polymerize all types of isocyanates but especially aliphatic or saturated isocyanates, which may be suitable for applications involving long-term exposure to the elements. A preferred drying agent/co-catalyst complex is an amine/organo tin complex, e.g., a DMEA/dibutyl tin dilaurate complex. For comparison, when DMEA is used alone to polymerize an aliphatic isocyanate drying times are typically about 3 hours. However, when the DMEA/dibutyl tin dilaurate complex described herein is used to polymerize the same aliphatic isocyanate the drying time is only about 8 minutes. The ratio of drying agent:co-catalyst is between 95 parts drying agent:5 parts co-catalyst and 85 parts drying agent:15 parts co-catalyst.

The drying agent, co-catalyst, water, hydrated catalyst complex and/or drying agent/co-catalyst complex are preferably used in the vapor phase. The term "vapor-phase" denotes that the agent is in gaseous or vapor form. Attainment of this phase is achieved by the atomization and subsequent vaporization of controlled quantities of the selected compound(s). The concentration levels (of water and drying agent(s)) may be varied in accordance with situational requirements and optimized for the production of catalyst complex formation.

Usually a substrate having a wet coating is exposed to an atmosphere having a relative humidity level within a range of about 40%-80% dependant upon the existing temperature which can lie within a range of about 10° C.-40° C. The drying agent, water and co-catalyst provide a catalyzing atmosphere through which the coated substrate is moved on a production line. An apparatus in which the curing process may be carried out is described, for example, in WO 2004/022249, which is hereby incorporated by reference. Typically, the atmosphere within the drying apparatus is maintained at about 25° C.

Solvents used in the isocyanate prepolymer wet coating may be blended and selected with regard to boiling point. For example, an excess of low boiling solvent may result in the formation of a layer of solvent on top of the drying coating, which can impede catalyst ingress. The layer of low boiling solvent may also prevent high boiling solvents from escaping the drying coating, which may retard final hardening of the film. Final hardening of the film may also be inhibited by an excess of high boiling solvent.

Additives may be introduced into the formulation as applied the substrate. Such additives may, for example, enhance hardness, scratch resistance, corrosion or chemical resistance, glossiness, or other properties desirable for the final product.

The description of the specific embodiments reveals general concepts that others can modify and/or adapt for various applications or uses that do not depart from the general concepts. Therefore, such adaptations and modifications should and are intended to be comprehended within the meaning and range of equivalents of the disclosed embodiments. It is to be understood that the phraseology or terminology employed herein is for the purpose of description and not limitation.

This specification contains numerous citations to references such as patents, patent applications, and publications. Each is hereby incorporated by reference.

What is claimed is:

1. A process for forming a dried coating upon a substrate comprising:
    applying a wet coating to a surface of the substrate, the wet coating including an isocyanate prepolymer; and
    polymerizing the wet coating by providing an atmosphere including a drying agent/co-catalyst complex and relative humidity in a range of about 40-80%,
    wherein a ratio of the drying agent to the co-catalyst is 95 parts by weight drying agent: 5 parts by weight co-catalyst.

\* \* \* \* \*